(12) United States Patent
Guy et al.

(10) Patent No.: US 9,436,932 B2
(45) Date of Patent: Sep. 6, 2016

(54) METHOD AND SYSTEM FOR HIGHLIGHTING EMAIL RECIPIENTS

(75) Inventors: Ido Guy, Haifa (IL); Inbal Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 12/550,417

(22) Filed: Aug. 31, 2009

(65) Prior Publication Data

US 2011/0055333 A1    Mar. 3, 2011

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 51/28* (2013.01); *H04L 51/32* (2013.01)

(58) Field of Classification Search
CPC ............................... H04L 51/28; H04L 51/32
USPC ........................................................ 709/206
See application file for complete search history.

(56) References Cited

U.S. PATENT DOCUMENTS

| | | | |
|---|---|---|---|
| 6,205,472 B1 * | 3/2001 | Gilmour ..................... | 709/206 |
| 7,269,590 B2 | 9/2007 | Hull et al. | |
| 7,334,020 B2 | 2/2008 | Caughey | |
| 2002/0099777 A1 * | 7/2002 | Gupta et al. ................ | 709/206 |
| 2002/0162025 A1 * | 10/2002 | Sutton et al. .............. | 713/201 |
| 2003/0158903 A1 * | 8/2003 | Rohall et al. ............. | 709/206 |
| 2003/0163530 A1 * | 8/2003 | Ribak et al. .............. | 709/206 |
| 2004/0117394 A1 * | 6/2004 | Chopra et al. ............ | 707/100 |
| 2004/0236749 A1 * | 11/2004 | Cortright et al. ............ | 707/9 |
| 2005/0182798 A1 * | 8/2005 | Todd et al. ............... | 707/200 |
| 2005/0198031 A1 * | 9/2005 | Pezaris et al. ............... | 707/9 |
| 2005/0198172 A1 * | 9/2005 | Appelman et al. .......... | 709/206 |
| 2005/0216300 A1 * | 9/2005 | Appelman et al. ............. | 705/1 |
| 2006/0190543 A1 * | 8/2006 | Pulver et al. ............. | 709/206 |
| 2006/0271859 A1 * | 11/2006 | Gorzela .................... | 715/738 |
| 2008/0207271 A1 * | 8/2008 | Krutik et al. .............. | 455/566 |

OTHER PUBLICATIONS

Hansell (Inbox 2.0: Yahoo and Google to Turn E-mail Into a Social Network, New York times, Nov. 13, 2007, http://bits.blogs.nytimes.com/2007/11/13/inbox-20-yahoo-and-google-to-turn-e-mail-into-a-social-network/?_php=true&_type=blogs&_r=0, accessed on Mar. 24, 2014).*

* cited by examiner

*Primary Examiner* — Liangche A Wang
*Assistant Examiner* — Sherman Lin
(74) *Attorney, Agent, or Firm* — Daniel Kligler (57) ABSTRACT

A method and system for highlighting email recipients according to a user's social network are provided. The method includes receiving an email message at a user's email client, the email message having multiple recipients, one of the recipients being the user. The method further includes obtaining a social network list for the user and comparing the social network list for the user with the email message recipients and highlighting recipients in the email message who are also in the social network list. The social network list for a user may be obtained by different methods including using the user's contact resources, or using an aggregating social network system including weighting relationships between contacts.

27 Claims, 6 Drawing Sheets

METHOD AND SYSTEM FOR HIGHLIGHTING EMAIL RECIPIENTS

FIELD OF THE INVENTION

This invention relates to the field of email messaging. In particular, the invention relates to highlighting email recipients.

BACKGROUND OF THE INVENTION

Many email messages, both within organizations and outside the firewall, are directed to a large amount of recipients. While in some cases, it is not very interesting for the recipient of an email message to be aware of other recipients of the message, in many other cases the recipient of the message is interested to know who else that he/she knows received the message. For example, a manager wants to see if any of his employees received the message; or a user wants to observe whether any of his close friends received the message as well.

For emails addressed to many recipients, the recipient list in the "To" and/or "Cc" header field gets harder to digest for the reader as those headers become larger. Thus, finding specific people on those lists becomes a time-consuming problem.

SUMMARY OF THE INVENTION

According to a first aspect of the present invention there is provided a method for highlighting email recipients, comprising: receiving an email message at a user's email client, the email message having multiple recipients, one of the recipients being the user; obtaining a social network list for the user; comparing the social network list for the user with the email message recipients; and highlighting recipients in the email message who are also in the social network list; wherein any of said steps are implemented in either of computer hardware or computer software embodied in a computer-readable medium.

The method may include determining if a received email message has greater than a threshold number of recipients and activating the highlighting step.

In one embodiment, obtaining a social network list for the user may include accessing a contact list from one or more of the user's resources. The method may include combining multiple contact lists from the user's resources to obtain a social network list for the user.

In an alternative embodiment, obtaining a social network list for the user may include aggregating social network information from sources external to the user. Aggregating social network information may include weighting relationships between contacts. This may include restricting the social network information to a given time range.

The method may include: receiving notification from a server of highlighted recipients who have read the email message; and providing additional highlighting of recipients of the email message who have read the email message.

The method may further include adapting the social network list according to the context of the email message.

According to a second aspect of the present invention there is provided a method of providing a service to a customer over a network, the service comprising: obtaining a social network list for a user; comparing the social network list for the user with email message recipients of a received email message; and highlighting recipients in the email message who are also in the social network list; wherein any of said steps are implemented in either of computer hardware or computer software embodied in a computer-readable medium.

According to a third aspect of the present invention there is provided a computer program product for highlighting email recipients, the computer program product comprising: a computer readable medium; computer program instructions operative to: receive an email message at a user's email client, the email message having multiple recipients, one of the recipients being the user; obtain a social network list for the user; compare the social network list for the user with the email message recipients; and highlight recipients in the email message who are also in the social network list; wherein said program instructions are stored on said computer readable medium.

According to a fourth aspect of the present invention there is provided a system for highlighting email recipients, comprising: an email client application at which an email message is received having multiple recipients, one of the recipients being the user, the email client including: a social network retrieval component for obtaining a social network list for the user; a comparison component for comparing the social network list for the user with the email message recipients; and a display component for highlighting recipients in the email message who are also in the social network list; wherein any of said email client application, social network retrieval component, comparison component, and display component are implemented in either of computer hardware or computer software and embodied in a computer readable medium.

The system may include a user interface for setting parameters regarding the highlighting of recipients.

The system may include an activation component for determining if a received email message has greater than a threshold number of recipients and activating the highlighting step.

In one embodiment, the social network retrieval component may include accessing contact lists from one or more of the user's resources. The social network retrieval component may combine multiple contact lists from the user's resources to obtain a social network list for the user.

In another embodiment, the social network retrieval component may aggregate social network information from sources external to the user. The social network retrieval component may aggregate social network information including weighting relationships between contacts. The social network retrieval component may also include restricting the social network information to a given time range.

The system may include: a server for receiving read events for email messages by recipients; the email client application including a recipient read notification mechanism for receiving notification from the server of highlighted recipients who have read the email message; and the display component providing additional highlighting of recipients of the email message who have read the email message.

The system may also include a context component for adapting the social network list according to the context of the email message.

In email messages addressed to a large amount of people, it is often hard for a recipient of the message to observe other relevant co-recipients who appear on the message. Highlighting of recipients is proposed from the user's social network who also appear as recipients of the message.

It is proposed that email clients are adapted to highlight for the user, recipients who are found to be related to him. In this way, the user can easily detect who he knows who also received the message.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Upon viewing an email message in a user's email client, the described method and system allow highlighting of recipients within the user's social network. The highlighting can be done in any appropriate manner, for example, by using a larger font (bold) and/or a different color. An option mechanism such as a button or menu option is provided that allows the user control over the highlighting feature.

The default of the highlighting of recipients can be one of three options:

1). No social network highlighting is set and upon user selection, highlighting will occur.

2). Social network highlighting for all messages is set and upon user selection, highlighting will stop.

3). Social network highlighting for messages with above X recipients is set, for example, X=20. Upon user selection highlighting/un-highlighting will occur. Controlling X can be allowed to the user through user preferences.

The core of the highlighting mechanism is retrieving the appropriate social network for the user, according to which highlighting will occur. Two possible embodiments are described for this.

The first embodiment uses an unweighted social network list that can be retrieved from the user's contact lists in the user's own sources. For example, the user's contact lists may include his address book, instant messaging (IM) buddylist, or a social network service (SNS) contacts (for example, IBM's (IBM is a trade mark of International Business Machines Corporation) internal Enterprise Social Network Site (see Dimicco, J. M., Geyer, W., Millen D. R., Dugan, C. and Bronholtz B., "People Sensemaking and Relationship Building on an Enterprise Social Network Site", *In Proc. HICSS* 2009, 1-10) or Facebook (Facebook is a trade mark of Facebook, Inc.). The social network list can be retrieved as the contact list from one of the user's sources or it can be retrieved by using combinations of the user's sources by union or intersection. The final outcome is a flat list of user IDs. These user IDs will be highlighted upon receiving of messages on whose header they co-occur with the user.

A second embodiment uses an aggregating social network system, for example, a system such as SONAR (SOcial Networking ARchitecture) (see reference "Harvesting with SONAR—The Value of Aggregating Social Network Information" I. Guy, M. Jacovi, E. Shahar, N. Meshulam, V. Soroka, S. Farrell, In proc. of CHI 2008). An aggregating social network system such as SONAR can provide a weighted social network list with scores representing the strength of relationships based on various data sources. The data source may be from across an organization or other social network sources. Using SONAR to retrieve the user's social network, more parameters can be taken into account while making a decision of which recipients to highlight. These parameters may include:

Strength of relationship—a threshold can be determined, above which recipients will be considered part of the user's social network and will be highlighted;

Date of relationship—a time window to consider while looking at the user's social network, rather than looking at it globally. For example, it can be chosen to focus on the last year;

Data sources to consider—for example, in certain scenarios it can be chosen to consider social software data sources only, like SNS's, blogs, and people tagging. In other scenarios, it can be chosen to use only organizational chart data.

Figure 1:
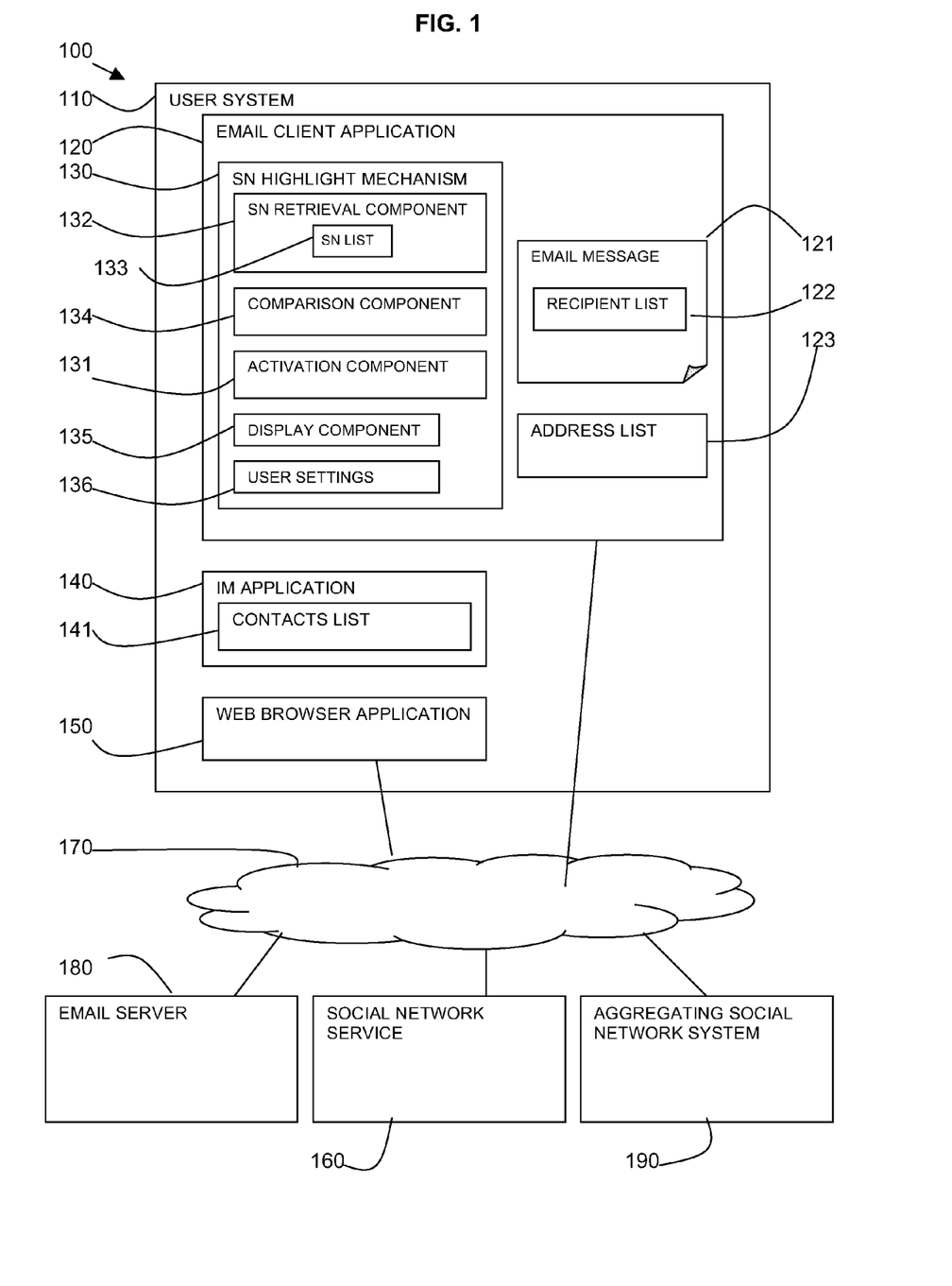
FIG. 1 is a block diagram of an email system in accordance with the present invention.

Referring to FIG. 1, a block diagram shows an email system 100 as described. The email system 100 includes an email client application 120 hosted by a user's system 110 which retrieves email messages 121 from a remote email server 180 via a network 170. The email client application 120 receives email messages 121 which include a recipient list 122 in the email message's header in the "to:" and "cc:" fields. The email client application 120 also includes an address list 123 of the email addresses used by the user.

The email client application 120 is extended to include a social network highlighting mechanism 130 as described. The social network highlighting mechanism 130 includes an activation component 131 to determine if the social network highlighting is to be activated when an email message 121 is received. The social network highlighting mechanism 130 also includes a social network retrieval component 132 for retrieving a social network list 133 to be used by the highlighting mechanism 130. The highlighting mechanism 130 includes a comparison component 134 for comparing the recipient list 122 of an email message 121 with the social network list 133. The social network highlighting mechanism 130 also includes a display component 135 for changing the display of the recipients in the email message 121.

A user settings component 136 is provided in the social network highlighting mechanism 130 in order for the user to set user preferences relating to the highlighting.

The user system 110 may also include other sources of contact information such as an instant messaging application 140 including a contacts list 141. The user system 110 may also include a web browser application 150 for accessing other sources of contact information such as social network services 160 via a network 170.

In one embodiment, the social network retrieval component 132 of the highlighting mechanism 130 uses user's sources of contact information (such as the email address list 123, an instant messaging contact list 141 and social network service 160 contact lists) to determine the social network list 133.

In another embodiment, the social network retrieval component 132 of the highlighting mechanism 130 uses external sources of contact information such as an aggregating social network system 190 which gathers and weights social network information relating to the user from external sources as described further below.

While the social network highlighting mechanism 130 may provide appropriate defaults for the parameters of the highlighting, the user may have control over them as well by inputting preferences in the user settings component 136. A preference menu is provided in which the user can control parameters, such as the strength threshold, the time window to consider, and the data sources to take into account. This is shown further in relation to FIG. 6.

After automatically retrieving the user's social network by the social network retrieval component 133, the user may be given manual control over the list by removing or adding people.

In each of the two embodiments (unweighted and weighted social networks), the IDs of the people on the entire network are mapped to email addresses. Based on these addresses, highlighting takes place.

An extension to the highlighting feature may be provided to display information about which recipients in the user's social network have already read an email message. This can be done by a second, different form of highlighting (font and/or color). Providing this information may facilitate collaboration for the user around the subject of the message and in some cases may even spare him the need to read the whole message.

The general case is considered where the email client application and the social network from which information about relationships is drawn are different. In this case, the email client application would store in a server information per user and per message for which the user is a recipient which will indicate whether the user has already read the message. This will be done based on events sent to the server upon opening a message on the client side. Then, when one of the message recipients opens it and ask for the feature of highlighting the social network as well as highlighting who from the social network has read the message, the email client application would issue a call for the server with all the relevant people (the recipients of the message who are part of the user's social network). The server will return for each of the individuals the read/unread status per the information stored. Based on this information, highlighting of read/unread is performed.

Read notification highlighting is very useful in the workplace in fostering collaboration around email messages. In some cases, it may help a user in deciding whether to skip reading a message. A second line manager may be able to get an indication of which of his first liners have already read the message. A project team member can also get an indication of whether a message has been read by other team members.

Figure 2:
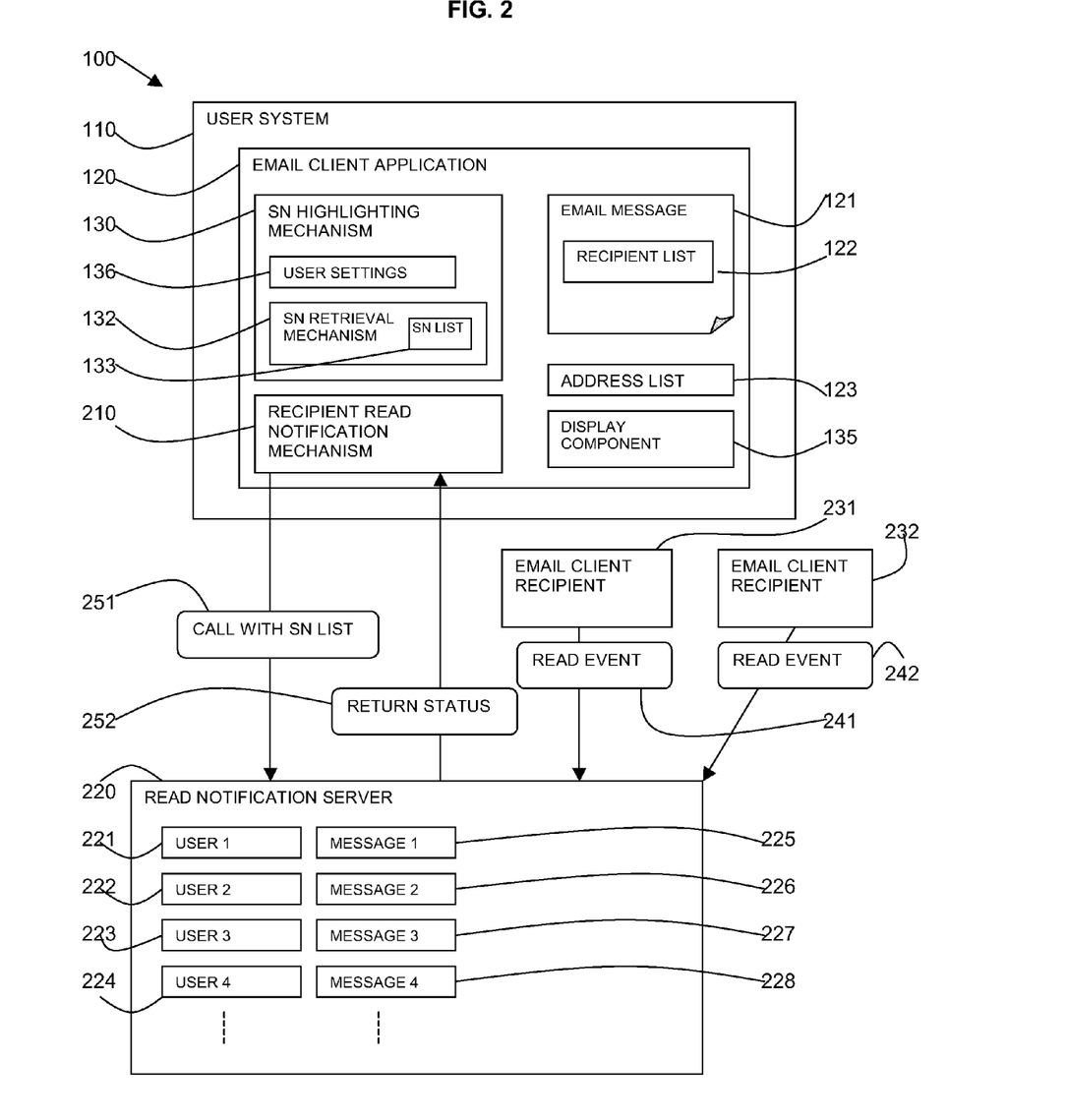
FIG. 2 is a block diagram of an email system in accordance with an aspect of the present invention.

Referring to FIG. 2, the email system 100 of FIG. 1 is shown with the extension of a recipient read notification mechanism 210 provided in the email client application 120.

A read notification server 220 is provided which maintains a record of users 221-224 and email messages 225-228. Email recipients 231, 232 of an email message 121 send read events 241, 242 for the message 121 to the read notification server 220 which updates its records of users 221-224 who have read a message 225-228.

The recipient read notification mechanism 210 at the user's email client application 120 calls 251 the read notification server 220 with the social network list 133 to find out which of the recipients on the social network list 133 have read the email message 121. A return status 152 is returned allowing the social network highlighting mechanism 130 of the user's email client application 120 to additionally highlight recipients of the email message 121 in the user's social network list 133 who have read the email message 121.

A further embodiment is provided in which the social network based on which the highlighting occurs is adapted to the specific context of the email message. For differing types of messages, differing highlighting will take place. This can be implemented with an aggregating social network system such as SOcial Networking ARchitecture (SONAR) and a search engine, as implemented in Social Networks and Discovery (SaND) (see reference: Ronen, I., Shahar, E., Ur, S., Uziel, E., Yogev, S., Zwerdling, N., Carmel, D., Guy, I., Har'el, N., and Ofek-Koifman, S., "Social networks and discovery in the enterprise (SaND)", In *Proc. SIGIR* 2009, 836.

The SaND system allows combining social network and content information and supports querying for a user's social network within a given context. The context can be described by a search query by combining several keywords (e.g.: "recommender systems"). Using a system like SaND, which is an extension to SONAR, the email application may ask for the social network of the user with respect to the context of the email message. The context of the email message can be derived, for example, by the title or by extracting the most meaningful keywords from the message's body. The user can then choose to highlight the social network with or without the context of the message.

Figure 3:
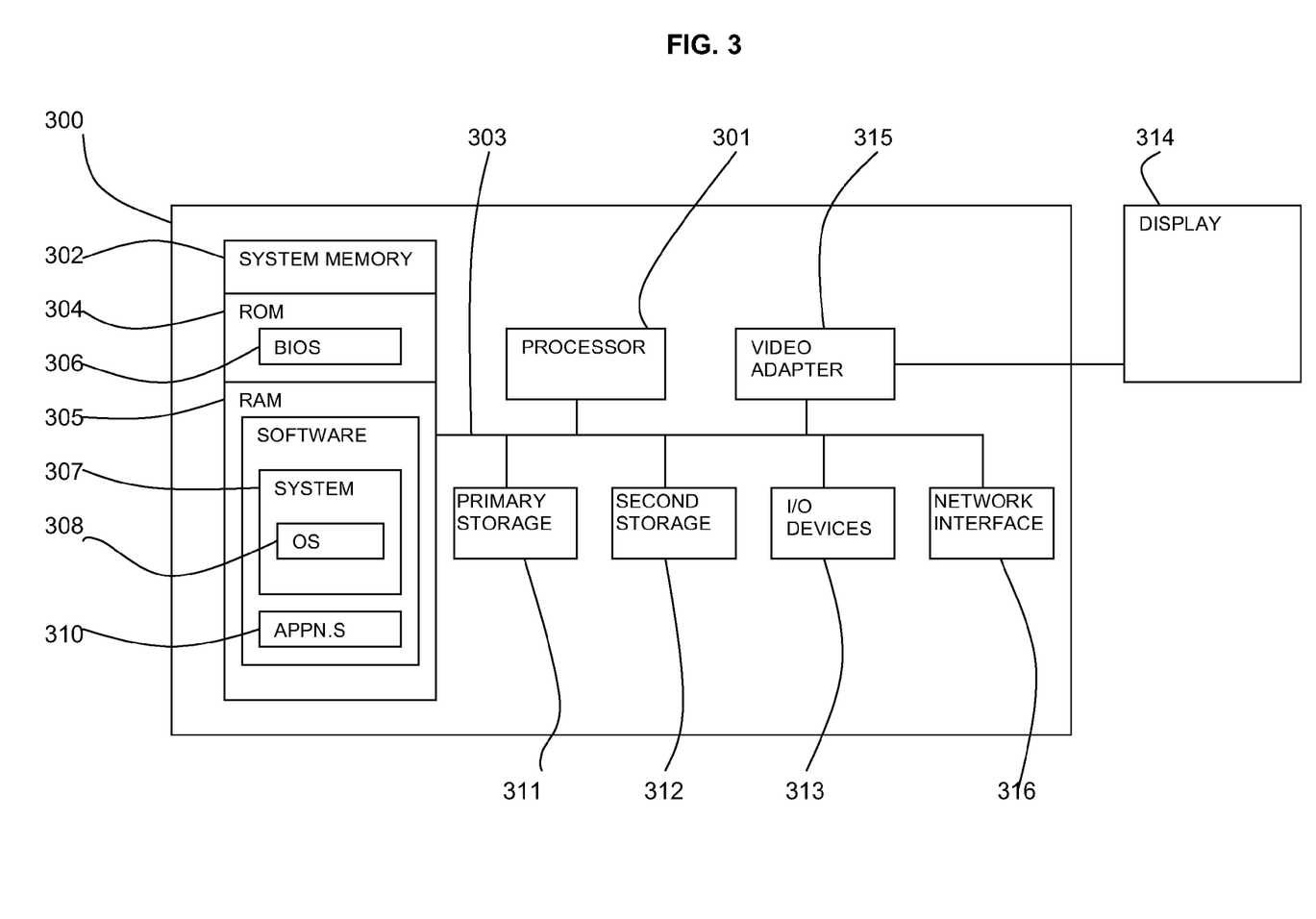
FIG. 3 is a block diagram of a computer system in which the present invention may be implemented.

Referring to FIG. 3, an exemplary system for implementing the described systems is shown includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
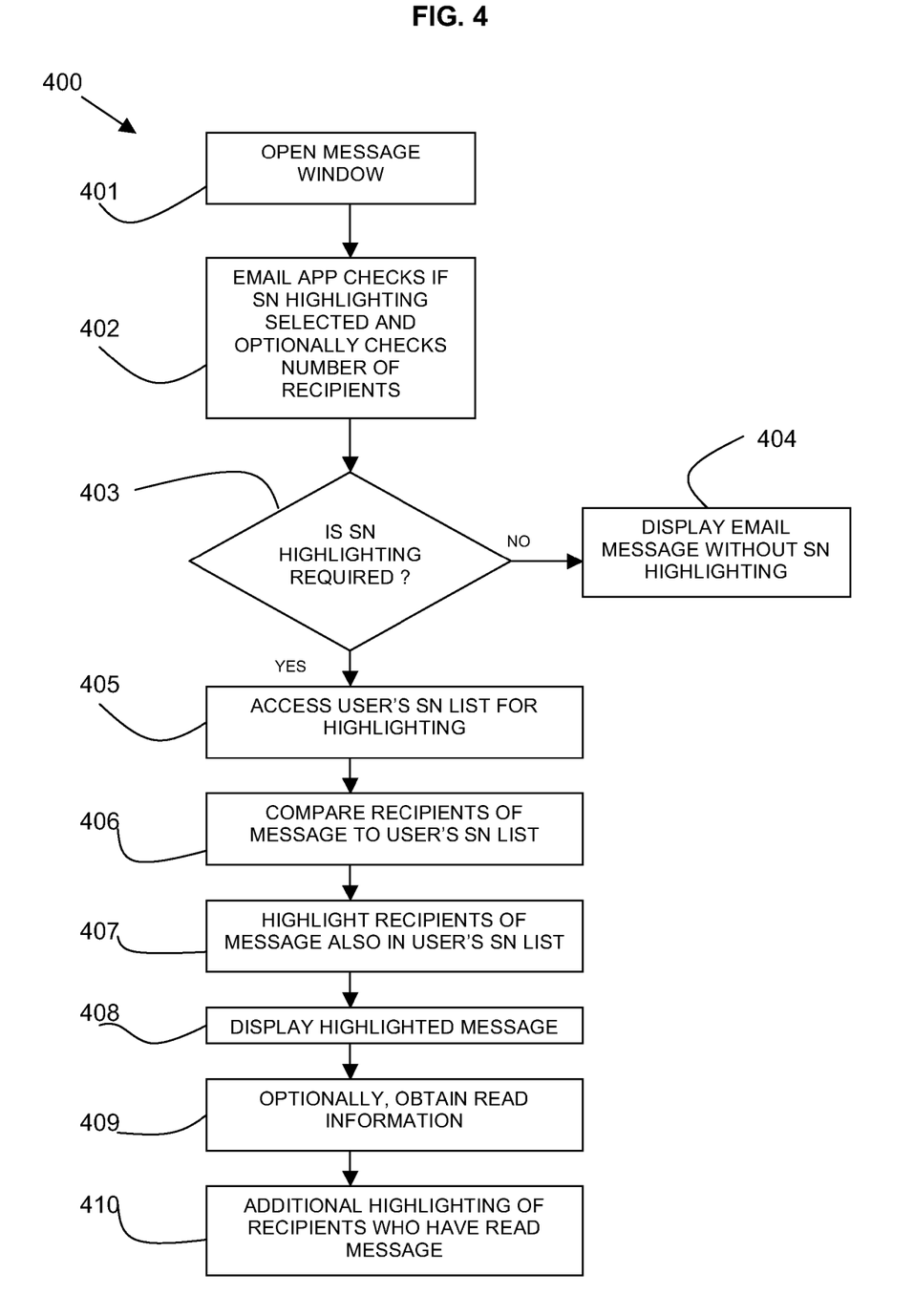
FIG. 4 is a flow diagram of a method at an email application in accordance with the present invention.

Referring to FIG. 4, a flow diagram 400 is shown as carried out by an email client application implementing the described social network highlighting of recipients in an email message.

An email message is opened 401 in a window on the user's system. The window shows a single message or a preview of it that includes all recipients. The email application checks 402 if social network highlighting is selected and, optionally, checks the number of recipients if the highlighting is dependent on the number. It is determined 403 if highlighting is required. If it is not required, the email message is displayed 404 without social network highlighting.

If the highlighting is required, the email application accesses 405 the user's social network list for highlighting as it retrieved according to the description above and considering the corresponding parameters. The recipients of the message are compared 406 to the social network list. The recipients of the message also in the user's social network list are highlighted 407 and the message is displayed 408.

Optionally, information can be obtained 409 of highlighted recipients who have read the message and an additional form of highlighting applied 410 to the recipients who have read the message.

Figure 5A:
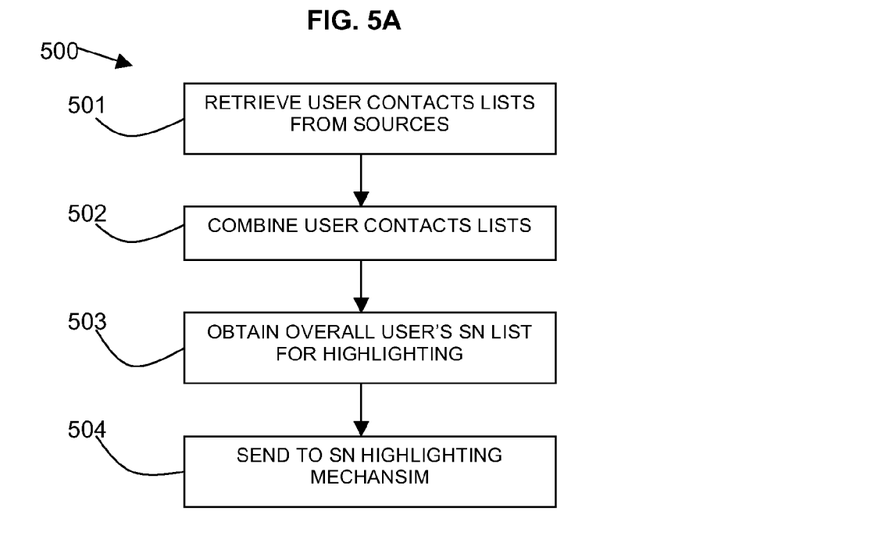
FIGS. 5A and 5B are flow diagrams of methods of obtaining social network information in accordance with aspects of the present invention.
Figure 5B:
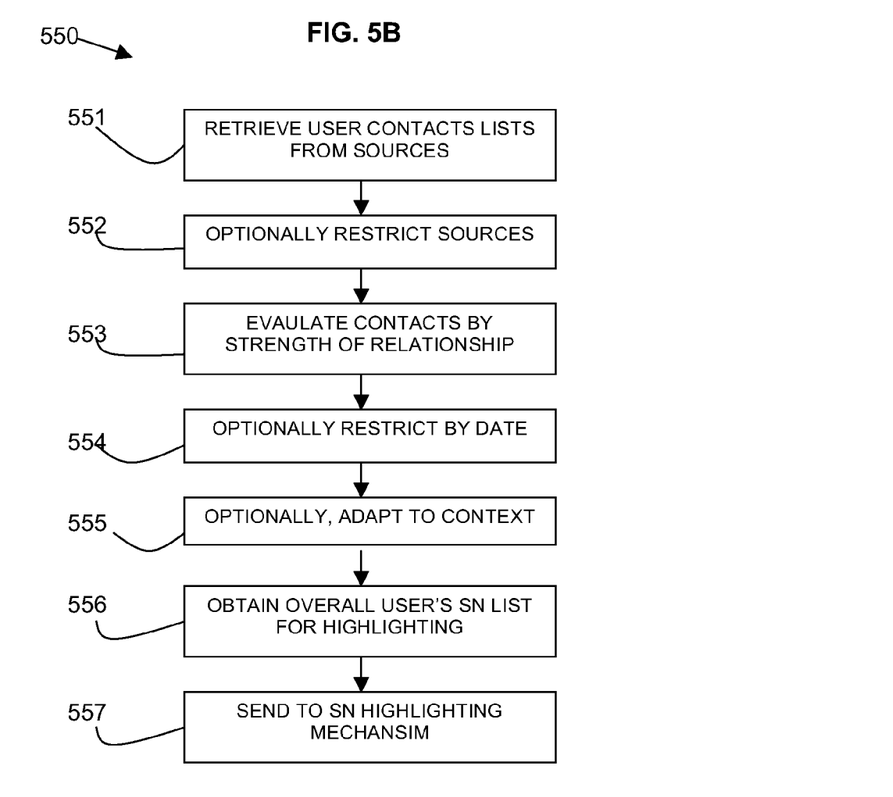

Referring to FIGS. 5A and 5B, flow diagrams 500, 550 show two embodiments of methods of obtaining the social network lists as accessed in step 405 of FIG. 4.

In the flow diagram 500 of FIG. 5A, contact lists are retrieved 501 from user's sources, for example, the email address list, instant messaging contacts list, and social network service contact lists to which the user subscribes. The contact lists are combined 502 using any required combination method, for example, a union of the list, or an intersection of the lists. The overall user's social network list is obtained 503 on which the highlighting is to be based and sent 504 to the social network highlighting mechanism.

In the flow diagram 550 of FIG. 5B, contact lists are retrieved 551 for the user and aggregated by a system from various sources. The sources may be from a single organization such as organizational charts, internal address lists, etc. Alternatively, the sources may be from publicly available sources. The sources may, optionally, be restricted 552. The contacts obtained for the user from the sources are evaluated 553 by the strength of relationship to the user. The evaluation may be restricted by date 554. The evaluation may also be restricted to a context 555 of the message. The overall user's social network list is obtained 556 on which the highlighting is to be based and sent 557 to the social network highlighting mechanism.

In one embodiment, a social network aggregating service such as SONAR (SOcial Networking ARchitecture) is used. SONAR is an API and architecture for retrieving and sharing social network data in an organization and aggregating it across applications. SONAR extracts information on who's connected to whom, with what strength, and based on what evidence. SONAR is implemented as a service using a REST API and can be used by various clients. It is currently in use by a Lotus Sametime client (SonarBuddies) (Lotus and Sametime are trade marks of International Business Corporation) and the web client of an employee profile application.

SONAR adheres to privacy restrictions, thus data extracted from emails and chats will be exposed only to their owner(s). ☐SONAR aggregates the data retrieved from its sources and extracts a weighted social network of a person and the artifacts connecting the people in that network. The weight factor expresses the strength of the connection between people. SONAR can also enable the extraction of a person's network according to a specific topic.

Figure 6:
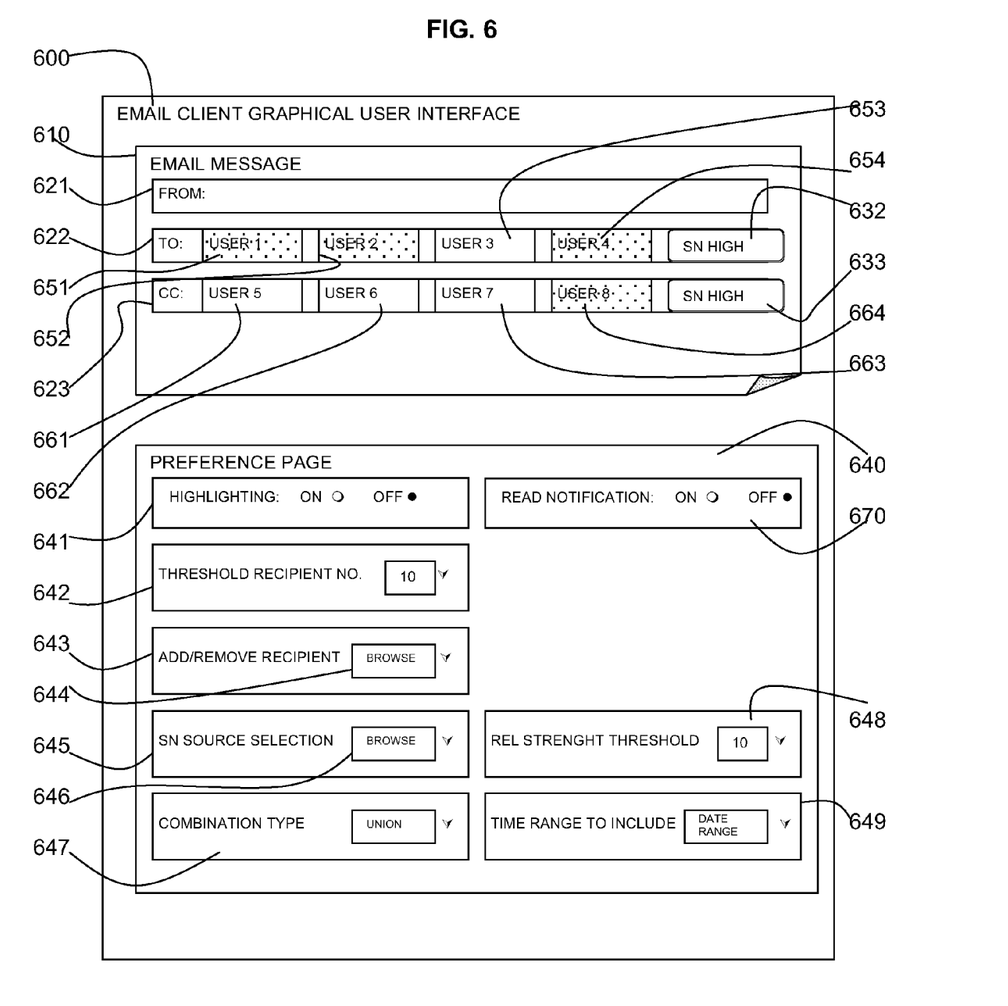
FIG. 6 is a diagram of an email client application graphical user interface in accordance with the present invention.

Referring to FIG. 6, a graphical user interface 600 is shown of an email client with the described functionality of highlighting social network recipients.

An email message 610 has a header 620 with a "from:" field 621, a "to:" field 622, and a "cc:" field 622. The "to:" and "cc:" fields 622, 623 each have a selection button 632, 633 for selecting to highlight recipients who are on a user's social network list. The selection button 632, 633 may include an activation (for example, a right-click of the button) to open a preference page 640. Multiple recipients 651-654, 661-664 in the "to:" and "cc" fields 622, 623 then include some recipients 651, 652, 654, 664 highlighted as belonging to the user's social network list. In addition, a second form of highlighting 654 shows the recipient belongs to the user's social network list and has read the email message 610.

The preference page 640 includes one or more of the following user setting options. An option 641 is provided to turn the highlighting on or off. A threshold option 642 for the number of recipients above which the highlighting is activated. An option 643 is provided to manually add or remove recipients from the social network list by the user. The option 643 to manually add or remove recipients includes a browse button 644 to select recipients to add or remove.

In addition, the preference page 640 may include social network source selection option 645. The social network sources may be selected from user sources or external sources and a browse button 646 is provided to select sources. A combination type option 647 for the combination of social network sources is provided with options of different types of combination.

For weighted social network systems, a relative strength threshold option 648 is provided. A time range option 649 to include in source selection is also provided.

Finally, a read notification option 670 may be selected by a user to activate a second form of highlighting to highlight recipients on the user's social network list that have read the email message 610.

The described features are added to existing email applications, which adapts email to Web 2.0 where social network information is ubiquitous. The system highlights people from within the user's network over email messages.

Many user's address books provide fairly sparse information, whereas social network sites are becoming more and more popular providing social network information for a user. The described method and system tap into external social network information to enrich the user's social network based on which highlighting in an email message takes place.

A social network highlighting system for email applications may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for highlighting addresses in a header of an email, comprising:
   receiving an email message at an email client of a specific user to which the email message is displayed on an email graphical interface, the email message having multiple recipients, one of the recipients being the specific user;
   retrieving contacts of the specific user, from one or more contact resources;
   obtaining a social network list for the specific user, incorporating information on relationship strengths of relationships of the specific user with the retrieved contacts;
   assigning contacts on the social network list with a relationship score representing a strength of the relationship of the contact with the specific user;
   generating a user contact list including retrieved contacts on the social network list having relationship strengths above a predetermined threshold;
   comparing the multiple recipients of the email message to the generated user contact list;
   selecting a sub-group of the multiple recipients based on the comparison, the sub-group including those of the multiple recipients having a relationship strength above the predetermined threshold; and
   highlighting email addresses of the selected sub-group of recipients in a header of the email message displayed to the specific user by the email graphical interface, such that only email addresses of a sub group of the recipients of the email, considered more closely related to the specific user, are highlighted,
   wherein any of said steps are implemented in either of computer hardware or computer software embodied in a computer-readable medium.

2. The method as claimed in claim 1, including:
   determining if a received email message has greater than a threshold number of recipients and activating the highlighting step only if the mail message has greater than a threshold number of recipients.

3. The method as claimed in claim 1, wherein obtaining the information on relationships of the specific user comprises accessing a contact list on a computer hosting the user's email client.

4. The method as claimed in claim 1, wherein obtaining the information on relationships of the specific user comprises accessing a contact list external to a computer hosting the user's email client.

5. The method as claimed in claim 1, including:
   receiving notification from a server of highlighted recipients who have read the email message; and
   providing additional highlighting of recipients of the email message who have read the email message.

6. The method as claimed in claim 1, wherein retrieving contacts of the specific user comprises combining addresses from a plurality of accessed lists of email addresses.

7. The method as claimed in claim 6, wherein combining the addresses from the plurality of lists comprises including in the user contact list an intersection of the plurality of accessed lists.

8. The method as claimed in claim 1, wherein the user contact list includes fewer than all the contacts in the one or more contact resources.

9. The method as claimed in claim 1, wherein highlighting recipients comprises highlighting recipients having a relationship with the user in a given time window.

10. The method as claimed in claim 1, wherein highlighting recipients comprises highlighting only recipients whose addresses are considered related to the specific user based on information from a social software data source, in a first scenario in which the email message is determined to belong to a social context and highlighting recipients whose addresses are considered related to the specific user based on information from an organizational source in a second scenario in which the email message is determined to belong to a work context.

11. The method as claimed in claim 1, wherein highlighting recipients comprises highlighting recipients selected according to keywords in the email.

12. The method of claim 1, wherein retrieving contacts of the specific user, from one or more contact resources comprises accessing one or more social software programs.

13. The method as claimed in claim 12, wherein the one or more accessed social software programs comprise an instant messaging buddylist.

14. The method as claimed in claim 12, wherein the one or more accessed social software programs comprise a blog.

15. The method as claimed in claim 1, wherein selecting the sub-group comprises determining one or more parameters to be used in evaluation of the relationship between the user and other recipients of the received email message and selecting the sub-group responsively to an evaluation of the relationship between the user and other people based on the determined one or more parameters.

16. The method as claimed in claim 15, wherein determining the one or more parameters comprises determining a context of the text of the email message and wherein highlighting fewer than all the recipients comprises highlighting recipients selected as most related to the specific user in the context of the message, wherein for a specific set of recipients, in different contexts different sub groups of the specific set of recipients are selected as most related to the specific user.

17. The method as claimed in claim 15, wherein determining the one or more parameters comprises determining responsive to user settings.

18. A computer program product for highlighting email recipients, the computer program product comprising:
   a non-transient computer readable medium; and
   computer program instructions operative to:
   receive an email message at a specific user's email client, to which the email message is displayed on an email graphical interface, the email message having multiple recipients, one of the recipients being the specific user;
   retrieve contacts of the specific user, from one or more contact resources;
   obtain a social network list for the specific user, incorporating information on relationship strengths of relationships of the specific user with the retrieved contacts;
   assign contacts on the social network list with a relationship score representing a strength of the relationship of the contact with the specific user;
   generate a user contact list including retrieved contacts on the social network list determined to have a relationship with the user with a relationship strength above a predetermined threshold;
   compare the generated user contact list to the email message recipients;
   select a sub-group of the multiple recipients based on the comparison, the sub-group including those of the multiple recipients having a relationship strength above the predetermined threshold; and
   highlight email addresses of recipients in the email message who are also in the selected sub-group, in a header of the email message displayed by an email graphical interface, such that only email addresses of a sub group of the recipients of the email, considered more closely related to the specific user, are highlighted;
   wherein said program instructions are stored on said computer readable medium.

19. The computer program product of claim 18, wherein the computer program instructions are operative to determine the context of the received email responsively to keywords from the email message and to assign the relationship score according to a relationship in the determined context.

20. A system for highlighting email recipients, comprising:
   a display; and
   a processor configured:
      to receive an email message at an email client of a specific user to which the email message is displayed on an email graphical interface, the email message having multiple recipients, one of the recipients being the specific user;
      to retrieve contacts of the specific user, from one or more contact resources;
      to obtain a social network list for a specific user, incorporating information on relationship strengths of relationships of the specific user with the retrieved contacts;
      to assign contacts on the social network list with a relationship score representing the strength of the relationship of the contact with the specific user;
      to generate a user contact list including retrieved contacts on the social network list, having with a relationship score above a predetermined threshold;
      to compare the multiple recipients of the email message to the generated user contact list;
      to select a sub-group of the multiple recipients based on the comparison, the sub-group including, those of the multiple recipients having a relationship strength above the predetermined threshold; and
      to display the email message, on the display,
      to highlight email addresses of recipients in the sub-group, in a header of the email messages displayed to the specific user by the email client application, such that only email addresses of a sub group of the recipients of an email, considered more closely related to the specific user, are highlighted.

21. The system as claimed in claim 20, including a user interface for setting parameters regarding the highlighting of recipients and wherein the processor is configured to adjust the highlighting according to settings received through the user interface.

22. The system as claimed in claim 20, wherein the processor is configured to highlight only received email messages having more than a threshold number of recipients.

23. The system as claimed in claim 20, including:
   a server for receiving read events for email messages by recipients;
   the email client application including a recipient read notification mechanism for receiving notification from the server of highlighted recipients who have read the email message; and
   the processor is configured to display additional highlighting of recipients of the email message who have read the email message.

24. The system as claimed in claim 20, wherein the processor is configured to highlight recipients selected according to a context of the text of the email message.

25. The system as claimed in claim 20, wherein the processor is configured to access a plurality of lists of email addresses and to obtain a social network list from the plurality of lists.

26. The system as claimed in claim 20, wherein the processor is configured to access one or more lists of email addresses stored internally on a computer including the processor.

27. The system as claimed in claim 20, wherein the processor is configured to access at least one list of email addresses external to a computer including the processor and to obtain a social network list from the external at least one list.

* * * * *